: US 11,551,411 B2
(45) Date of Patent: Jan. 10, 2023

(12) United States Patent
Ito et al.

(54) DATA PROCESSOR, DATA PROCESSING METHOD, AND DATA PROCESSING PROGRAM FOR DETERMINING CORRESPONDENCE RELATIONSHIPS BETWEEN LASER SCANNING POINT CLOUDS

(71) Applicant: Topcon Corporation, Tokyo (JP)

(72) Inventors: Tadayuki Ito, Tokyo (JP); Takeshi Sasaki, Tokyo (JP)

(73) Assignee: Topcon Corporation, Tokyo (JP)

( * ) Notice: Subject to any disclaimer, the term of this patent is extended or adjusted under 35 U.S.C. 154(b) by 0 days.

(21) Appl. No.: 17/445,399

(22) Filed: Aug. 18, 2021

(65) Prior Publication Data

US 2022/0068019 A1 Mar. 3, 2022

(30) Foreign Application Priority Data

Sep. 2, 2020 (JP) .............................. JP2020-147407

(51) Int. Cl.
*G06T 17/00* (2006.01)

(52) U.S. Cl.
CPC .................................... *G06T 17/00* (2013.01)

(58) Field of Classification Search
CPC ....... G06T 17/00; G01S 7/4808; G01S 17/42; G01S 17/86; G01S 17/88; G01S 17/89; G06V 20/56
See application file for complete search history.

(56) References Cited

U.S. PATENT DOCUMENTS

| 10,215,858 | B1 * | 2/2019 | Klein | G06V 10/803 |
| 10,290,117 | B2 * | 5/2019 | Park | G06T 7/75 |
| 11,216,663 | B1 * | 1/2022 | Ettinger | G05D 1/0016 |

(Continued)

FOREIGN PATENT DOCUMENTS

| EP | 2990828 A1 | 3/2016 |
| JP | 2016-045150 A | 4/2016 |

OTHER PUBLICATIONS

Extended European Search Report dated Jan. 25, 2022, in connection with European Patent Application No. 21190819.9, 9 pgs.

*Primary Examiner* — Phong X Nguyen
(74) *Attorney, Agent, or Firm* — Chiesa, Shahinian & Giantomasi PC

(57) ABSTRACT

Correspondence relationships between two laser scanning point clouds are easily determined with high accuracy. A data processor includes a laser scanning point cloud acquiring unit and a laser scanning point cloud correspondence relationship determining unit. The laser scanning point cloud acquiring unit acquires a first laser scanning point cloud that is obtained in a first time period and a second laser scanning point cloud that is obtained in a second time period. The laser scanning point cloud correspondence relationship determining unit determines correspondence relationships between the first laser scanning point cloud and the second laser scanning point cloud on the basis of a laser scanning point cloud relating to a fixed object. The fixed object is contained in both the first laser scanning point cloud and the second laser scanning point cloud and does not change between the first time period and the second time period.

7 Claims, 6 Drawing Sheets

(56) References Cited

U.S. PATENT DOCUMENTS

| | | | |
|---|---|---|---|
| 2010/0207936 A1* | 8/2010 | Minear | G06T 7/30 |
| | | | 345/419 |
| 2016/0063717 A1 | 3/2016 | Sasaki et al. | |
| 2016/0187486 A1* | 6/2016 | Chen | G01S 17/86 |
| | | | 702/94 |
| 2018/0089536 A1* | 3/2018 | Feng | G01S 7/4808 |
| 2019/0291723 A1* | 9/2019 | Srivatsa | G06V 10/454 |
| 2020/0088858 A1* | 3/2020 | Li | G06T 7/80 |
| 2020/0096641 A1* | 3/2020 | Sasaki | G01C 15/002 |
| 2020/0318975 A1* | 10/2020 | Yoshida | G09B 29/00 |
| 2021/0304518 A1* | 9/2021 | Gao | G01C 21/3811 |
| 2022/0048530 A1* | 2/2022 | Wyffels | G06V 20/56 |
| 2022/0068019 A1* | 3/2022 | Ito | G01S 17/88 |
| 2022/0180541 A1* | 6/2022 | Zweigle | H04N 5/2258 |

* cited by examiner

DATA PROCESSOR, DATA PROCESSING METHOD, AND DATA PROCESSING PROGRAM FOR DETERMINING CORRESPONDENCE RELATIONSHIPS BETWEEN LASER SCANNING POINT CLOUDS

TECHNICAL FIELD

The present invention relates to a technique utilizing information obtained by a laser scanner.

BACKGROUND

Japanese Unexamined Patent Application Laid-Open No. 2016-45150 discloses a technique for performing laser scanning by using a laser scanner mounted on a vehicle.

Techniques utilizing a laser scanning point cloud in various types of assessments, maintenance, etc., are publicly known. The laser scanning point cloud or laser scanning data can be of road facilities, etc., which is obtained by performing laser scanning using a laser scanner while a vehicle is traveling with the laser scanner mounted thereon.

These techniques involve performing laser scanning on the same target at a predetermined time interval and comparing the obtained laser scanning point clouds. In these techniques, it is necessary to determine correspondence relationships between a first laser scanning point cloud and a second laser scanning point cloud. This process is also called "registration" in terms of alignment.

Types of software-based techniques for determining correspondence relationships between laser scanning point clouds have been developed. However, determination of correspondence relationships among a large number of point clouds requires massive processing and can cause problems such as hanging of processing before completion or occurrence of erroneous processing, and therefore, this processing is not practical in use. For this reason, currently, processing relating to the determination of correspondence relationships is conducted by using both software processing and manual processing of an operator, consuming large amounts of time and labor.

SUMMARY

In view of these circumstances, an object of the present invention is to provide a technique that makes it easy to determine correspondence relationships between two laser scanning point clouds with high accuracy.

The present invention provides a data processor including a laser scanning point cloud acquiring unit and a laser scanning point cloud correspondence relationship determining unit. The laser scanning point cloud acquiring unit acquires a first laser scanning point cloud that is obtained in a first time period and a second laser scanning point cloud that is obtained in a second time period. The laser scanning point cloud correspondence relationship determining unit determines correspondence relationships between the first laser scanning point cloud and the second laser scanning point cloud on the basis of a laser scanning point cloud relating to a fixed object. The fixed object is contained in both the first laser scanning point cloud and the second laser scanning point cloud and does not change between the first time period and the second time period.

In the present invention, the data processor may also include an image acquiring unit and a fixed object detecting or specifying unit. The image acquiring unit may acquire a first photographic image of a target of the first laser scanning point cloud, the first photographic image captured in the first time period, and may acquire a second photographic image of a target of the second laser scanning point cloud, the second photographic image captured in the second time period. The fixed object detecting or specifying unit may detect or specify the fixed object in the first photographic image and in the second photographic image.

In the present invention, at least one of the first laser scanning point cloud and the second laser scanning point cloud may be obtained by laser scanning during traveling, and the first photographic image and the second photographic image that are acquired may have the same or similar viewpoint.

In the present invention, the data processor may also include a point cloud image generator that generates, on the basis of the first laser scanning point cloud, a first point cloud image as seen from a camera at a location and in an attitude at the time of capturing the first photographic image, and that generates, on the basis of the second laser scanning point cloud, a second point cloud image as seen from a camera at a location and in an attitude at the time of capturing the second photographic image.

In the present invention, the data processor may also include a superposed image generator, a partial point cloud cutting out unit, a partial point cloud correspondence relationship determining unit, and a laser scanning point cloud correspondence relationship determining unit. The superposed image generator may generate a first superposed image by superposing the first photographic image and the first point cloud image one on the other and may generate a second superposed image by superposing the second photographic image and the second point cloud image one on the other. The partial point cloud cutting out unit may cut out a first partial point cloud relating to the fixed object from the first laser scanning point cloud, on the basis of the first superposed image, and may cut out a second partial point cloud relating to the fixed object from the second laser scanning point cloud, on the basis of the second superposed image. The partial point cloud correspondence relationship determining unit may determine correspondence relationships between the first partial point cloud and the second partial point cloud. The laser scanning point cloud correspondence relationship determining unit may determine correspondence relationships between the first laser scanning point cloud and the second laser scanning point cloud on the basis of the correspondence relationships between the first partial point cloud and the second partial point cloud.

In the present invention, points of the first laser scanning point cloud in which distances from the viewpoint of the first superposed image are further than a predetermined distance, may exist in the first point cloud image, but may not be available in the first superposed image.

In the present invention, shape and dimensions of the fixed object that are obtained based on the first superposed image and shape and dimensions of the fixed object that are obtained based on the second superposed image, may differ from each other by threshold values or less.

In the present invention, multiple fixed objects may be used, and distances between the multiple fixed objects that are calculated based on the first superposed image and distances between the multiple fixed objects that are calculated based on the second superposed image, may differ from each other by a threshold value or less.

The present invention can also be understood to be a data processing method including acquiring a first laser scanning point cloud that is obtained in a first time period and a second laser scanning point cloud that is obtained in a second time period. The method also includes determining correspondence relationships between the first laser scanning point cloud and the second laser scanning point cloud on the basis of a laser scanning point cloud relating to a fixed object. The fixed object is contained in both the first laser scanning point cloud and the second laser scanning point cloud and does not change between the first time period and the second time period.

The present invention can also be understood to be a non-transitory computer recording medium storing computer executable instructions that, when executed by a computer processor, cause the computer processor to acquire a first laser scanning point cloud that is obtained in a first time period and a second laser scanning point cloud that is obtained in a second time period. The computer executable instructions, when executed by a computer processor, also cause the computer processor to determine correspondence relationships between the first laser scanning point cloud and the second laser scanning point cloud on the basis of a laser scanning point cloud relating to a fixed object. The fixed object is contained in both the first laser scanning point cloud and the second laser scanning point cloud and does not change between the first time period and the second time period.

The present invention makes it easy to determine correspondence relationships between two laser scanning point clouds with high accuracy.

DETAILED DESCRIPTION

Overview

Figure 1:
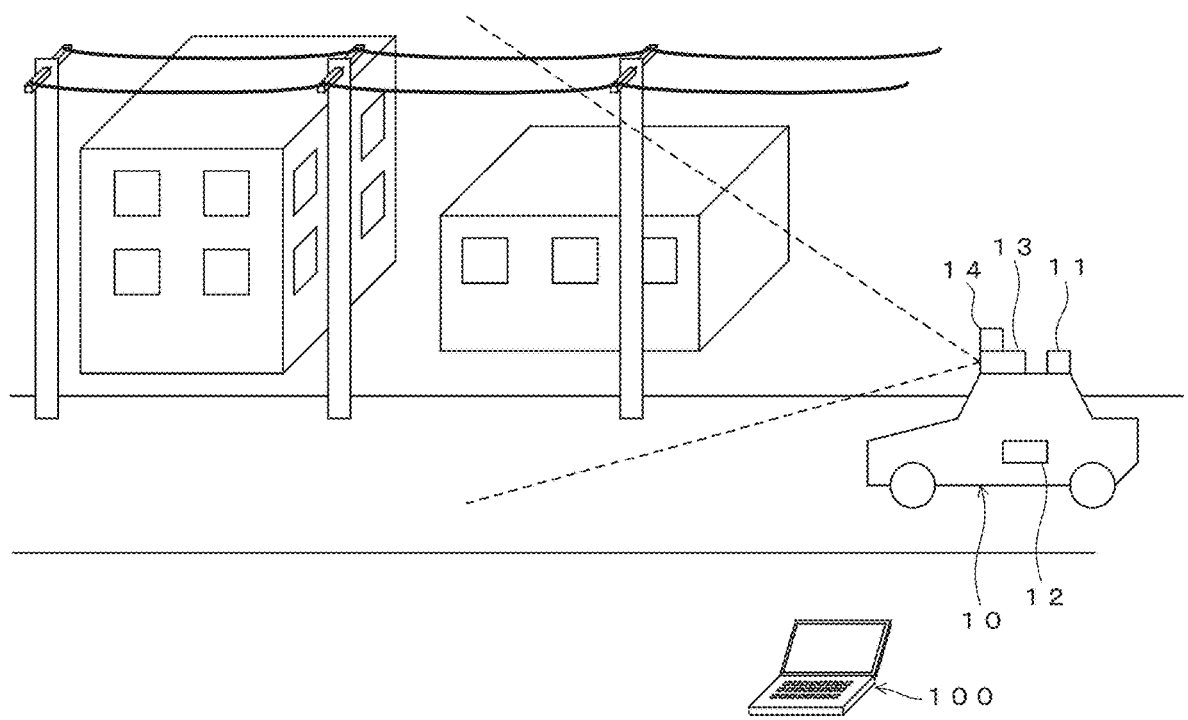
FIG. 1 is an overview of an embodiment.

FIG. 1 shows an overview of an embodiment. A vehicle 10 obtains a laser scanning point cloud or laser scanning data of a measurement target by making a laser scanner 13 perform laser scanning on the target while the vehicle 10 is traveling on a road. The measurement target shown in FIG. 1 is merely an example, and the measurement target is not specifically limited. Examples of the measurement target include infrastructure facilities and buildings. Cliffs, banks, etc., can also be used as the measurement target.

The vehicle 10 is mounted with a GNSS location measuring device 11, an IMU 12, a laser scanner 13, and a camera 14. Positional relationships between the GNSS location measuring device 11, the IMU 12, the laser scanner 13, and the camera 14 on the vehicle 10 are known in advance. In addition, attitude or directional relationships between the IMU 12, the laser scanner 13, and the camera 14 are also known in advance. That is, exterior orientation parameters between the laser scanner 13 and the camera 14 are known in advance.

Instead of the vehicle 10, a mobile body such as a train, a ship, or an aircraft can also be used. The mobile body is not limited to a manned vehicle, and it may be an unmanned vehicle.

The GNSS location measuring device 11 performs positioning based on a navigation signal from a navigation satellite, such as a GPS satellite. The IMU 12 is an inertial measurement device and measures changes in acceleration and attitude. The laser scanner 13 performs laser scanning to obtain a laser scanning point cloud. The camera 14 consecutively takes photographic images or takes a moving image of a laser scanning target of the laser scanner 13.

Location in the absolute coordinate system or global coordinate system of the vehicle 10 can be measured and determined by the GNSS location measuring device 11 and the IMU 12. The absolute coordinate system is a coordinate system used in a GNSS and describes a location in terms of latitude, longitude, and elevation. The location of the vehicle 10 may be measured by using wheel measurement data of the vehicle 10 in addition to GNSS data and IMU data.

The laser scanning point cloud and the photographic images are obtained in association with time data by the laser scanner 13 and the camera 14, respectively.

The laser scanning is performed by the laser scanner 13 while the vehicle 10 is traveling. At the same time as the laser scanning, photographing is performed on the same target by the camera 14. The photographing is consecutive photographing or moving image photographing. That is, while the vehicle 10 is traveling, laser scanning is performed by the laser scanner 13, and at the same time, consecutive photographing or moving image photographing is performed on the same target by the camera 14.

The laser scanning point cloud that is obtained by the laser scanner 13 and the photographic image data that is obtained by the camera 14 are transmitted to a data processor 100.

In this example, while the vehicle 10 is traveling, the laser scanner 13 performs laser scanning on a measurement target, for example, each type of infrastructure facility, and the camera 14 takes photographs of this measurement target, whereby a laser scanning point cloud and image data of the measurement target are obtained.

The laser scanning and the photographing are performed on the same target multiple times at a predetermined time interval. In one example, the frequency is once in half a year or once a year. Thereafter, laser scanning point clouds that are obtained at an Nth time and at an N+1th time are compared with each other, in order to monitor deformation and deterioration of the infrastructure facility. For example, a slope of an expressway is monitored by the above-described method, and the need for more detailed inspection or repair work is evaluated.

First laser scanning and second laser scanning may be performed by the same laser scanner or may be performed by different laser scanners. The same applies to the camera.

Data Processor

Figure 2:
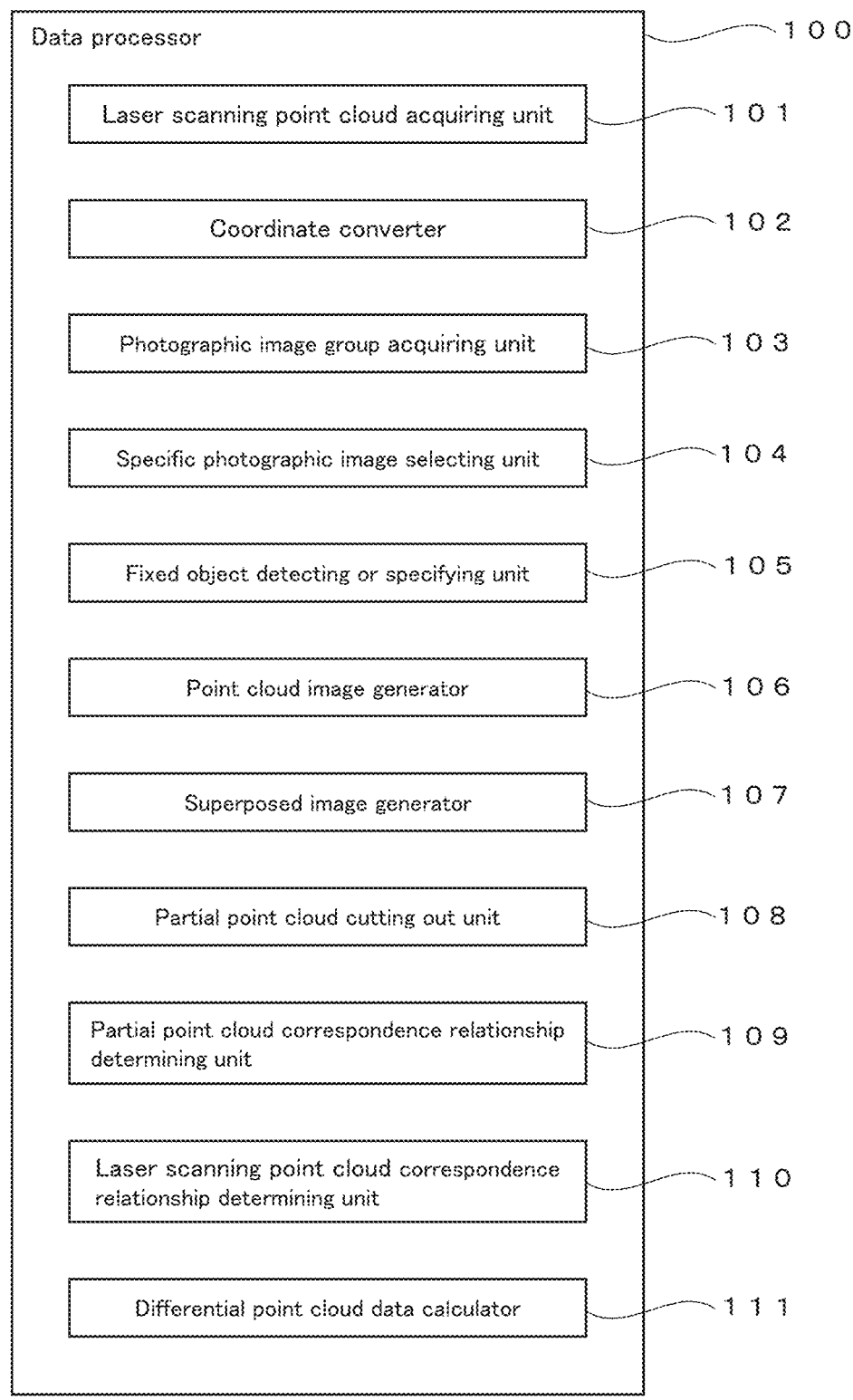
FIG. 2 is a block diagram of a data processor.

FIG. 2 shows a block diagram of the data processor 100. In this example, the data processor 100 is constituted by using a commercially available personal computer (PC). The PC used includes a CPU, a memory, a hard disk drive, a display, such as a liquid crystal display device, various user interface devices, such as a keyboard and a mouse, various input-output interfaces, and other devices and functions that are provided to an ordinary PC.

An application software program for implementing functional units shown in FIG. 2 is installed in this PC, and the data processor 100 shown in FIG. 2 is implemented by software. One, some, or all of the functional units of the data processor 100 can be composed of a dedicated electronic circuit. In one example, it is possible to compose one, some, or all of the functional units of the data processor 100 by using an FPGA. In addition, one, some, or all of the functional units of the data processor 100 can also be composed by using a data processing server that is connected to an internet line.

The data processor 100 includes a laser scanning point cloud acquiring unit 101, a coordinate converter 102, a photographic image group acquiring unit 103, a specific photographic image selecting unit 104, a fixed object detecting or specifying unit 105, a point cloud image generator 106, a superposed image generator 107, a partial point cloud cutting out unit 108, a partial point cloud correspondence relationship determining unit 109, a laser scanning point cloud correspondence relationship determining unit 110, and a differential point cloud data calculator 111.

The laser scanning point cloud acquiring unit 101 acquires data of laser scanning point clouds or point cloud data obtained by the laser scanner 13. For example, a first laser scanning point cloud that is obtained at a first timing and a second laser scanning point cloud that is obtained at a second timing are acquired by the laser scanning point cloud acquiring unit 101.

The coordinate converter 102 converts the coordinate system of each point of the laser scanning point cloud, which is obtained by the laser scanner 13 while the vehicle 10 is traveling, into the absolute coordinate system. The laser scanning is performed by the laser scanner 13 while the vehicle 10 is traveling, and therefore, more exactly, the coordinate systems of points or laser scanning points of the obtained laser scanning point cloud differ from each other.

Location and attitude of the vehicle 10 or the laser scanner 13 in the absolute coordinate system at each time instant can be calculated by using GNSS data, IMU data, wheel measurement data, or the like. That is, location and attitude of the vehicle 10 at the time each point is obtained by laser scanning can be determined by calculation.

Thus, on the basis of location and attitude of the vehicle 10 or of laser scanner 13 at the time each point is obtained by laser scanning, each point can be arranged in the absolute coordinate system. This enables describing the laser scanning point cloud in the absolute coordinate system. The above process is performed by the coordinate converter 102.

The photographic image group acquiring unit 103 acquires image data of photographic images captured by the camera 14. The image data contains still images that are consecutively captured or a moving image. In the case of using a moving image, frame images that compose the moving image are used as still images.

The specific photographic image selecting unit 104 selects a first photographic image from a first photographic image group and selects a second photographic image from a second photographic image group.

The fixed object detecting or specifying unit 105 detects or specifies a fixed object in each of the specific images that are selected by the specific photographic image selecting unit 104. The fixed object is an object that can be assumed to not change and to not move during the time interval of obtaining the first laser scanning data and the second laser scanning data to be compared with each other. Examples of the fixed object include utility poles, signs, steel towers, and buildings. The fixed object depends on the measurement target. For example, sidewalk edges, fences, and objects like boundary lines between roads and buildings also can be used as the fixed object.

The object that is specified is an object that can be assumed to be the same between a photographic image captured in the first laser scanning and the photographic image captured in the second laser scanning.

The fixed object is specified automatically or manually or both. Automatic specification is performed as follows. A library of fixed object images is preliminarily generated, and a fixed object is extracted from the photographic images that are captured by the camera 14, by using an image recognition technique with reference to the library. Manual specification is performed by an operator such that an operator specifies a fixed object by manually selecting a specific area or in another manner. Multiple fixed objects are specified.

Note that fixed objects within a predetermined distance are specified. This is because as distance increases, errors in distance information increase, which can reduce accuracy in matching performed later.

The point cloud image generator 106 generates a point cloud image as seen from the viewpoint of the photographic image captured by the camera 14, that is, a camera position, and also as seen from the camera 14 in the attitude at the time of capturing the photographic image, that is, the direction of the optical axis. Herein, the point cloud image is an image showing a laser scanning point cloud as a set of points.

The point cloud image is generated as follows. First, the laser scanning point cloud is correctly arranged in the absolute coordinate system by the process of the coordinate converter 102. The location and attitude in the absolute coordinate system of the camera 14 at the time of capturing the photographic image selected by the specific photographic image selecting unit 104 can be calculated by using GNSS data, IMU data, wheel measurement data, or the like. In these conditions, in a case in which one photographic image that is captured by the camera 14 is specified, the location and attitude in the absolute coordinate system of the camera 14 at the time of capturing this photographic image are determined, and a laser scanning point cloud as seen from the camera 14 at the location and in the attitude is drawn as an image. That is, a point cloud image as seen from the camera 14 at the location and in the attitude at the time of capturing the photographic image is generated.

Figure 5:
FIG. 5 shows an example of a photographic image.
Figure 6:
FIG. 6 is a point cloud image corresponding to FIG. 5.

FIG. 5 shows an example of the photographic image captured by the camera 14. FIG. 6 is an example of a point cloud image corresponding to FIG. 5. FIGS. 5 and 6 are images as seen from the same viewpoint and as seen in the state of the same attitude or from the same direction. Herein, FIG. 5 is a photographic image captured by the camera 14, and FIG. 6 is an image showing a laser scanning point cloud as a set of points.

Figure 7:
FIG. 7 is a superposed image in which the photographic image in FIG. 5 and the point cloud image in FIG. 6 are superposed one on the other.

The superposed image generator 107 generates a superposed image by superposing one on the other the photographic image captured by the camera 14 and the point cloud image as seen from the viewpoint of the photographic image and as seen from the camera 14 in the attitude at the time of capturing the photographic image. This superposed image shows laser scanning points, which are points reflecting laser scanning light, as points in an ordinary photographic image. As described above, the point cloud image is generated in accordance with the location and attitude of the camera 14 at the time of capturing the photographic image. That is, for a specific image, a point cloud image of a target having a similar composition as in the specific image and seen in a similar manner as in the specific image is generated. Thus, correspondence relationships between the specific photographic image and the point cloud image are already determined and can be superposed one on the other. FIG. 7 is a superposed image in which the camera image in FIG. 5 and the point cloud image in FIG. 6 are superposed or superimposed one on the other.

The partial point cloud cutting out unit 108 obtains a laser scanning point cloud of a fixed object as a partial point cloud. This process is performed as follows. For example, after a fixed object is specified in the image, the laser scanning point cloud of the fixed object is extracted by using the superposed image, which is generated by the superposed image generator 107. In this process, the laser scanning point cloud corresponding to the partial image that is specified in the superposed image is extracted.

In one example, it is assumed that a utility pole on the front right side in FIG. 5 is detected as a fixed object. In this case, the superposed image in FIG. 7 is used, and the laser scanning point cloud at the part overlapping the image of the utility pole is extracted as a partial point cloud relating to the utility pole. In this manner, the laser scanning point cloud at the part specified as the fixed object, is extracted as a partial point cloud from the laser scanning point cloud.

Note that the laser scanning point cloud at a part farther than a predetermined distance is not used as the partial point cloud. FIG. 7 does not show laser scanning points in an area exceeding a specific distance in order to not allow utilizing and acquiring a partial point cloud in this area. This is because as the distance increases, positioning error of points increases, which can reduce accuracy of a matching process utilizing a fixed object. The point cloud image in FIG. 6 shows the laser scanning point cloud that is not available in FIG. 7.

The partial point cloud should be one having such a density of laser scanning points that it can represent the shape of the fixed object. The following describes an example of determining this density. In one example, it is assumed that a utility pole is used as a fixed object. In this case, whether the partial point cloud can represent the shape of the utility pole is determined. If the shape of the utility pole cannot be represented, the point cloud is determined as having an insufficient density and is not used as the partial point cloud.

The partial point cloud correspondence relationship determining unit 109 determines correspondence relationships between a first partial point cloud and a second partial point cloud. The first partial point cloud is a laser scanning point cloud of the fixed object contained in the first laser scanning point cloud obtained in a first time period. The second partial point cloud is a laser scanning point cloud of the fixed object contained in the second laser scanning point cloud obtained in a second time period. The correspondence relationships are determined by a matching method based on feature points or the like or by point cloud matching.

In one example, it is assumed that a utility pole is used as the fixed object. In this case, correspondence relationships between the laser scanning point cloud (first partial point cloud) relating to the utility pole in the first laser scanning point cloud and the laser scanning point cloud (second partial point cloud) relating to the utility pole in the second laser scanning point cloud are determined. Normally, this process is performed on multiple fixed objects.

The laser scanning point cloud correspondence relationship determining unit 110 determines correspondence relationships between the two laser scanning point clouds, that is, the first laser scanning point cloud and the second laser scanning point cloud, based on the correspondence relationships of the fixed object between the two laser scanning point clouds, which are determined by the partial point cloud correspondence relationship determining unit 109.

For example, it is assumed that correspondence relationships of multiple fixed objects are determined between the first laser scanning point cloud and the second laser scanning point cloud. In other words, positional relationships of the multiple fixed objects are determined between the two laser scanning point clouds. In this state, correspondence relationships of the other point clouds can also be determined by aligning the locations of these fixed objects. Thus, the correspondence relationships between the first laser scanning point cloud and the second laser scanning point cloud are determined.

The differential point cloud data calculator 111 calculates a difference between the first laser scanning point cloud and the second laser scanning point cloud. This reveals a laser scanning point cloud that does not correspond between the two laser scanning point clouds. In one example, it is assumed that the scanned target is deformed or partially falls off after the first laser scanning is performed. In this case, the deformed part and the defective part due to falling off are parts at which the first laser scanning point cloud and the second laser scanning point cloud do not correspond to each other. The part at which the two laser scanning point clouds do not correspond to each other is a component that can be obtained by the above difference calculation.

The differential component may be monitored in order to monitor deformation and falling off in an infrastructure facility due to passage of time. In one example, it is possible to monitor a concrete surface for phenomena, such as deformation and falling off.

Example of Processing

The following describes an example of operations and processing. First, first laser scanning is performed in a first time period, and a first laser scanning point cloud is obtained. This laser scanning is performed on a measurement target or a monitored target by using the laser scanner 13 while the vehicle 10 is traveling. In addition, at the same time as the first laser scanning, photographing of the target that is subjected to laser scanning is performed by the camera 14, whereby a first photographic image group is captured.

Next, after some time has passed, second laser scanning and photographing are performed on the same target as in the first laser scanning, whereby a second laser scanning point cloud and a second photographic image group are obtained. The second laser scanning is performed by using the laser scanner 13, in the same conditions as in the first laser scanning as much as possible. The time interval between the first laser scanning and the second laser scanning is determined in accordance with the measurement target. In one example of an infrastructure facility, laser scanning is performed at an interval of several months to one year. The measurement interval may be shorter or longer.

The first laser scanning provides a first laser scanning point cloud, and the second laser scanning provides a second laser scanning point cloud. In addition, a first photographic image group is captured simultaneously with the first laser scanning point cloud, and a second photographic image group is captured simultaneously with the second laser scanning point cloud. At this stage, the processing shown in FIGS. 3 and 4 is performed by using the data processor 100 in FIGS. 1 and 2.

Figure 3:
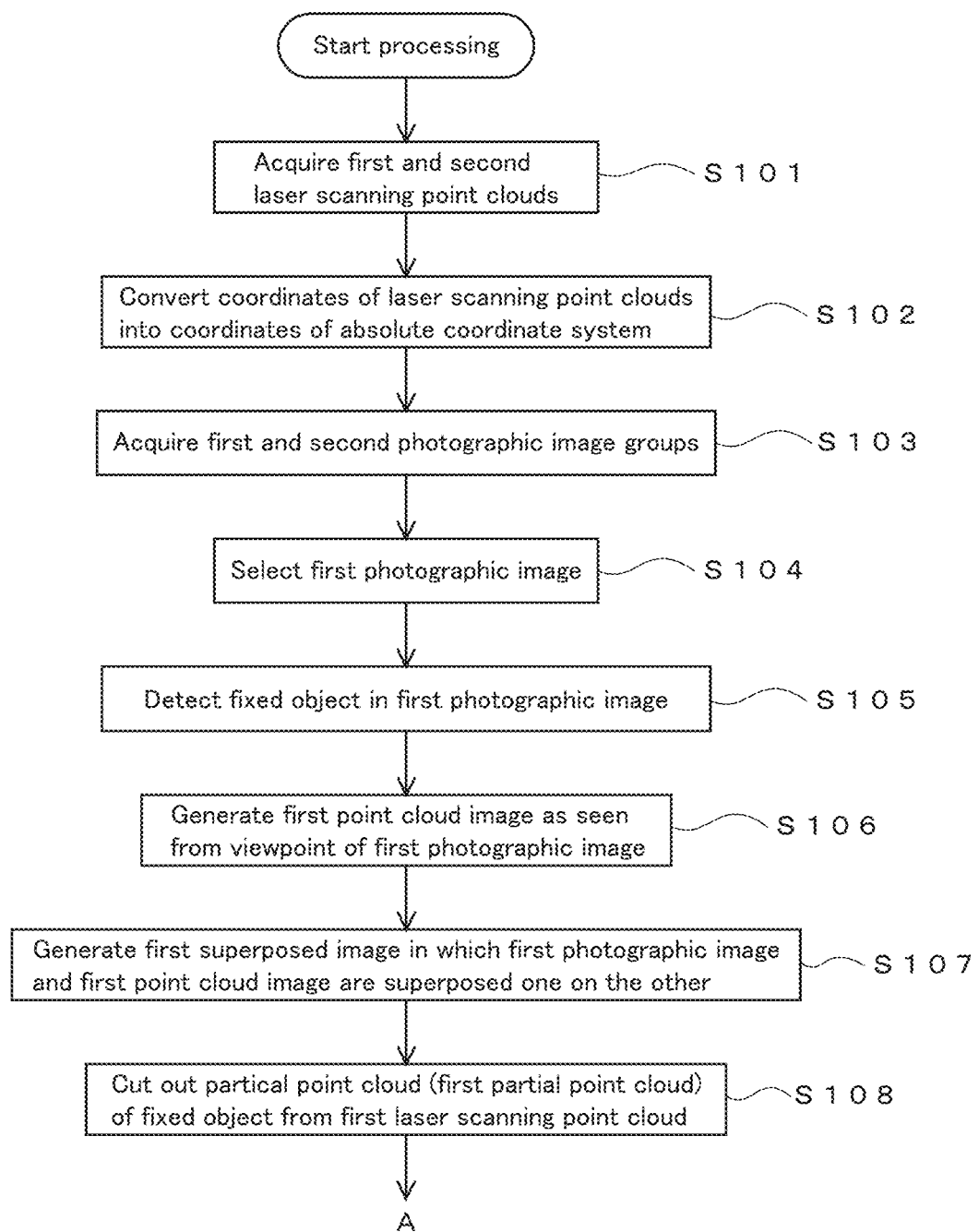
FIG. 3 is a flowchart showing an example of a processing procedure.
Figure 4:
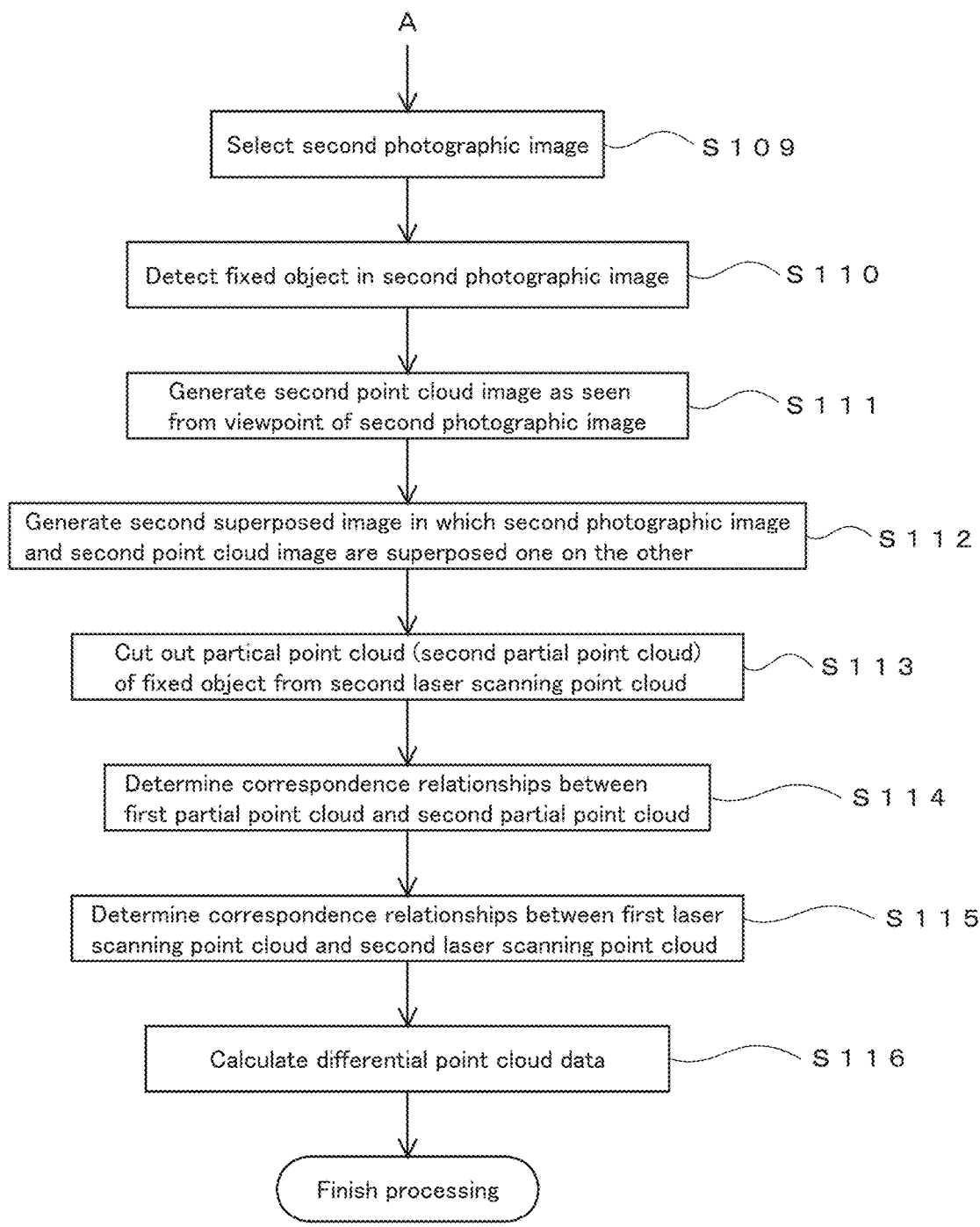
FIG. 4 is a flowchart showing an example of a processing procedure.

The program for executing the processing in FIGS. 3 and 4 is stored in a storage device, such as a semiconductor memory or a hard disk drive, of the PC constituting the data processor 100, and the program is executed by the CPU of the PC. This program can be stored in an appropriate storage medium. Alternatively, it is also possible to store this program in a server and download it therefrom.

The outline of the processing follows. First, a fixed object is recognized and extracted from the photographic image that is captured at the time the first laser scanning point cloud is obtained, and a first partial point cloud corresponding to the fixed object is cut out from the first laser scanning point cloud. Then, a similar process is performed on the second laser scanning point cloud, and a second partial point cloud corresponding to the first partial point cloud is cut out from the second laser scanning point cloud. Thereafter, correspondence relationships between the first partial point cloud and the second partial point cloud are obtained, and these correspondence relationships are used to determine correspondence relationships between the first laser scanning point cloud and the second laser scanning point cloud. Lastly, a difference between the first laser scanning point cloud and the second laser scanning point cloud is obtained, whereby a part that has changed is determined.

The following describes details of the processing procedure. After the processing starts, first, a first laser scanning point cloud and a second laser scanning point cloud are acquired (step S101). This process is performed by the laser scanning point cloud acquiring unit 101 in FIG. 2.

Then, coordinates of the first laser scanning point cloud and the second laser scanning point cloud are converted into coordinates of the absolute coordinate system (step S102). This process is performed by the coordinate converter 102 in FIG. 2.

Moreover, image data of a first photographic image group and a second photographic image group are acquired (step S103). This process is performed by the photographic image group acquiring unit 103. The first photographic image group contains a large number of photographic images that are consecutively captured by the camera 14 at the same time as the first laser scanning. The second photographic image group contains a large number of photographic images that are consecutively captured by the camera 14 at the same time as the second laser scanning. Alternatively, it is possible to capture a moving image and acquire frame images that compose the moving image as an image group.

Next, a first photographic image in which a fixed object is to be detected is selected from the first photographic image group (step S104). This process is performed by the specific photographic image selecting unit 104. An image that contains fixed objects is selected as the first photographic image. The selection of the first photographic image is performed manually or automatically. Multiple photographic images can be selected as the first photographic images.

Then, a fixed object is detected in the first photographic image, which is selected in step S104 (step S105). This process is performed by the fixed object detecting or specifying unit 105. The fixed object is detected automatically or manually. In the manual detection, a fixed object that is specified by a user is detected. Multiple fixed objects are specified.

Next, a point cloud image of the first laser scanning point cloud as seen from the viewpoint of the first photographic image, that is, a first point cloud image, is generated (step S106). This process is performed by the point cloud image generator 106.

Then, a first superposed image is generated by superposing the first photographic image and the first point cloud image one on the other (step S107). This process is performed by the superposed image generator 107.

Thereafter, a point cloud corresponding to the fixed object that is detected in the first photographic image is cut out as a first partial point cloud, from the first laser scanning point cloud (step S108). This process is performed by the partial point cloud cutting out unit 108.

Next, a second photographic image is selected from the second photographic image group (step S109). This process is performed by the specific photographic image selecting unit 104. In this process, an image that contains the same target as in the first photographic image is selected. With regard to multiple first photographic images, second photographic images respectively corresponding thereto are selected.

For example, an image that is captured at a camera location closest to the camera location for the first photographic image is found in the second photographic image group, and this image is selected as the second photographic image. Among the second photographic image group, an image that is captured by the camera at the location and in the attitude closest to those of the camera that captures the first photographic image, may be used as the second photographic image.

Then, a fixed object is detected in the second photographic image (step S110). This process is performed by the fixed object detecting or specifying unit 105. This process detects an object that is assumed to be the same as the fixed object detected in the first photographic image in step S105, as the fixed object.

Next, a point cloud image of the second laser scanning point cloud as seen from the viewpoint of the second photographic image, that is, a second point cloud image, is generated (step S111). This process is performed by the point cloud image generator 106.

Then, a second superposed image is generated by superposing the second photographic image and the second point cloud image one on the other (step S112). This process is performed by the superposed image generator 107.

Thereafter, a point cloud corresponding to the fixed object that is detected in the second photographic image is cut out as a second partial point cloud, from the second laser scanning point cloud (step S113). This process is performed by the partial point cloud cutting out unit 108.

Then, correspondence relationships between the first partial point cloud and the second partial point cloud are determined (step S114). This process is performed by the partial point cloud correspondence relationship determining unit 109.

Then, on the basis of the correspondence relationships between the first partial point cloud and the second partial point cloud obtained in step S114, correspondence relationships between the first laser scanning point cloud and the second laser scanning point cloud are determined (step S115). This process is performed by the laser scanning point cloud correspondence relationship determining unit 110.

Next, differential point cloud data is calculated (step S116). This process is performed by the differential point cloud data calculator 111 in FIG. 2. This process calculates a difference between the first laser scanning point cloud and the second laser scanning point cloud, in which the correspondence relationships are already determined. That is, the first laser scanning point cloud and the second laser scanning point cloud are compared with each other, and a different part is calculated.

Obtaining of the laser scanning point cloud is not limited to two times, and it may be continuously performed at a specific time interval by third laser scanning, fourth laser scanning, etc. The time interval of obtaining laser scanning point clouds in the case of performing laser scanning three or more times may not be constant. The laser scanning point clouds from which the difference is calculated are not limited to laser scanning point clouds that are next to each other on the time axis. In one example, it is also possible to compare a first laser scanning point cloud and a fourth laser scanning point cloud with each other.

Application of Three-Dimensional Model

A three-dimensional model can be generated based on a laser scanning point cloud, and this three-dimensional model can be used as information to be compared.

Application of Stationary Scanner

The laser scanner that is used in at least one of the first and the second laser scanning can be a stationary laser scanner equipped with a camera.

Determination of Fixed Object

Determination may be performed in order to reduce erroneous extraction of a fixed object. The following describes an example. First, it is assumed that a fixed object is already detected in each of the first photographic image and the second photographic image. A first determination is performed on these fixed objects such that color information of the fixed objects of the two images is compared with each other to determine whether the difference in color is a threshold value or less. In this case, the color of each image is normalized, and the difference is determined by comparing.

In the case in which the first determination results in YES, location information of the fixed object in the first photographic image and location information of the corresponding fixed object in the second photographic image is acquired from the superposed images, and a second determination is performed to determine whether the difference in location information is a threshold value or less. In the case in which the second determination results in YES, information relating to shape and dimensions of the fixed object is acquired from each of the two laser scanning point clouds, and a third determination is performed to determine whether the difference between these pieces of information is a threshold value or less.

The first to the third determinations are performed on every fixed object. The following fourth determination is then performed on the fixed object for which the first to the third determinations result in YES. In the fourth determination, relative positional relationships between multiple fixed objects are compared with each other to determine positional conformity, whereby abnormal objects are removed.

In this example, it is determined whether three-dimensional location relationships between a certain fixed object and other fixed objects can be assumed to be the same between the first laser scanning point cloud and the second laser scanning point cloud.

First, two fixed objects are selected from each of the first laser scanning point cloud and the second laser scanning point cloud. At this time, the selected fixed objects have a distance therebetween of a predetermined value or less. This is because the accuracy of the distance between the two fixed objects is important, and if this distance is long, accuracy decreases.

In this state, it is assumed that the distance between the two fixed objects in the first laser scanning point cloud is represented as L1, whereas the distance between the two fixed objects in the second laser scanning point cloud is represented as L2. The distances L1 and L2 can be of a distance between positions of centers of gravity of the two fixed objects, a distance between specific points of the two fixed objects, an average of distances between multiple points extracted from the two fixed objects, etc.

The difference between the distances L1 and L2 is then calculated. In the case in which the resultant value is a predetermined threshold value or less, it is determined that the selected two fixed objects correspond to each other between the first laser scanning point cloud and the second laser scanning point cloud.

For example, it is assumed that utility poles 1 and 2 are selected from the first laser scanning point cloud, and utility poles 1' and 2' are selected from the second laser scanning point cloud. Herein, the utility poles 1 and 1' are fixed objects that are assumed to be the same object, and the utility poles 2 and 2' are fixed objects that are assumed to be the same object. The distance L1 between the utility poles 1 and 2 is calculated, the distance L2 between the utility poles 1' and 2' is also calculated, and then the difference between the distances L1 and L2 is calculated. In the case in which this difference is a threshold value or less, the relationships of the fixed objects between the first laser scanning point cloud and the second laser scanning point cloud are determined to be appropriate.

The absolute location of the laser scanning point cloud relating to the fixed object contains errors relating to positioning accuracy of a GNSS. However, the distance between the two fixed objects is calculated by offsetting the errors and is thus not affected by the positioning accuracy of a GNSS. With the use of this principle, two fixed objects that are selected in a first laser scanning point cloud and two fixed objects that are selected in a second laser scanning point cloud are identified.

If the fourth determination results in NO, there is a possibility that at least one of the selected two fixed objects is erroneously extracted. With respect to one fixed object, the fourth determination is performed multiple times by changing the counterpart of the pair of the one fixed object to another fixed object. Then, the pair of the fixed objects in which the determination results in YES, are extracted as a correct pair. In this manner, fixed objects that are contained in both the first laser scanning point cloud and the second laser scanning point cloud are selected.

Other Examples of Detection of Fixed Objects

In a case in which an object to be used as a fixed object is known in advance by map information or the like, the vicinity of the object may be searched for, and the fixed object may be detected. The following describes an example of this case. First, information of a location A of a fixed object, such as a sign, is obtained from map information. Then, an image that contains the location A is retrieved from a first photographic image group. Specifically, the camera location and the camera attitude of images of the first photographic image group are known, and therefore, an image containing the location A on an optical axis or in the vicinity of the optical axis is retrieved. The retrieved photographic image is used as a first photographic image.

Next, a first point cloud image corresponding to the first photographic image is generated, and moreover, a first superposed image is generated by superposing the first photographic image and the first point cloud image one on the other. Then, a point closest to the location A is extracted from the points in the first superposed image, and an image overlapping this point is obtained from the first superposed image or the corresponding first photographic image.

For example, it is assumed that a horizontal location of a sign that can be used as a fixed object is described in map information. In this case, points that are distributed in the vertical direction on the horizontal location are extracted, and an image of the sign is identified from an image overlapping these points. Thus, a fixed object is detected in the first photographic image by using map information.

In summary, the above processing involves obtaining a location of a fixed object from map information that describes the fixed object, detection of a specific image containing the fixed object from a photographic image group, based on the location of the fixed object, generation of a point cloud image corresponding to the specific image, generation of a superposed image in which the specific image and the point cloud image are superposed one on the other, and identification of the image of the fixed object based on the location of the fixed object and the superposed image. This processing is the same for a first laser scanning point cloud (first photographic image group) and a second laser scanning point cloud (second photographic image group).

What is claimed is:

1. A data processor comprising a processor or circuitry, the processor or circuitry configured to:
   acquire a first laser scanning point cloud that is obtained in a first time period and a second laser scanning point cloud that is obtained in a second time period;
   acquire a first photographic image of a target of the first laser scanning point cloud and acquire a second photographic image of a target of the second laser scanning point cloud, the first photographic image captured in the first time period, the second photographic image captured in the second time period;
   detect or specify a fixed object in the first photographic image and in the second photographic image, the fixed object being contained in both the first laser scanning point cloud and the second laser scanning point cloud and not changing between the first time period and the second time period;
   generate a first point cloud image on a basis of the first laser scanning point cloud and generate a second point cloud image on a basis of the second laser scanning point cloud, the first point cloud image being an image that is seen from a camera at a location at the time of capturing the first photographic image, the second point cloud image being an image that is seen from a camera at a location at the time of capturing the second photographic image;
   generate a first superposed image by superposing the first photographic image and the first point cloud image one on the other and generate a second superposed image by superposing the second photographic image and the second point cloud image one on the other;
   cut out a first partial point cloud relating to the fixed object from the first laser scanning point cloud, on a basis of the first superposed image, and cut out a second partial point cloud relating to the fixed object from the second laser scanning point cloud, on a basis of the second superposed image;
   determine correspondence relationships between the first partial point cloud and the second partial point cloud; and
   determine correspondence relationships between the first laser scanning point cloud and the second laser scanning point cloud on a basis of the correspondence relationships between the first partial point cloud and the second partial point cloud.

2. The data processor according to claim 1, wherein at least one of the first laser scanning point cloud and the second laser scanning point cloud is obtained by laser scanning during traveling, and the first photographic image and the second photographic image that are acquired have the same or similar viewpoints as viewpoints from which their respective laser scanning point clouds are acquired.

3. The data processor according to claim 1, wherein points of the first laser scanning point cloud in which distances from the viewpoint of the first superposed image are further than a predetermined distance, exist in the first point cloud image but are not available in the first superposed image.

4. The data processor according to claim 1, wherein a shape and dimensions of the fixed object that are obtained based on the first superposed image and a shape and dimensions of the fixed object that are obtained based on the second superposed image, differ from each other by threshold values or less.

5. The data processor according to claim 1, wherein multiple fixed objects are used, and distances between the multiple fixed objects that are calculated based on the first superposed image and distances between the multiple fixed objects that are calculated based on the second superposed image, differ from each other by a threshold value or less.

6. A data processing method comprising:
   acquiring a first laser scanning point cloud that is obtained in a first time period and a second laser scanning point cloud that is obtained in a second time period;
   acquiring a first photographic image of a target of the first laser scanning point cloud and acquiring a second photographic image of a target of the second laser scanning point cloud, the first photographic image captured in the first time period, the second photographic image captured in the second time period;
   detecting or specifying a fixed object in the first photographic image and in the second photographic image, the fixed object being contained in both the first laser scanning point cloud and the second laser scanning point cloud and not changing between the first time period and the second time period;
   generating a first point cloud image on a basis of the first laser scanning point cloud and generating a second point cloud image on a basis of the second laser scanning point cloud, the first point cloud image being an image that is seen from a camera at a location at the time of capturing the first photographic image, the second point cloud image being an image that is seen from a camera at a location at the time of capturing the second photographic image;
   generating a first superposed image by superposing the first photographic image and the first point cloud image one on the other and generating a second superposed image by superposing the second photographic image and the second point cloud image one on the other;
   cutting out a first partial point cloud relating to the fixed object from the first laser scanning point cloud, on a basis of the first superposed image, and cutting out a second partial point cloud relating to the fixed object from the second laser scanning point cloud, on a basis of the second superposed image;

determining correspondence relationships between the first partial point cloud and the second partial point cloud; and determining correspondence relationships between the first laser scanning point cloud and the second laser scanning point cloud on a basis of the correspondence relationships between the first partial point cloud and the second partial point cloud.

7. A non-transitory computer recording medium storing computer executable instructions that, when executed by a computer processor, cause the computer processor to:

acquire a first laser scanning point cloud that is obtained in a first time period and a second laser scanning point cloud that is obtained in a second time period;

acquire a first photographic image of a target of the first laser scanning point cloud and acquire a second photographic image of a target of the second laser scanning point cloud, the first photographic image captured in the first time period, the second photographic image captured in the second time period;

detect or specify a fixed object in the first photographic image and in the second photographic image, the fixed object being contained in both the first laser scanning point cloud and the second laser scanning point cloud and not changing between the first time period and the second time period;

generate a first point cloud image on a basis of the first laser scanning point cloud and generate a second point cloud image on a basis of the second laser scanning point cloud, the first point cloud image being an image that is seen from a camera at a location at the time of capturing the first photographic image, the second point cloud image being an image that is seen from a camera at a location at the time of capturing the second photographic image;

generate a first superposed image by superposing the first photographic image and the first point cloud image one on the other and generate a second superposed image by superposing the second photographic image and the second point cloud image one on the other;

cut out a first partial point cloud relating to the fixed object from the first laser scanning point cloud, on a basis of the first superposed image, and cut out a second partial point cloud relating to the fixed object from the second laser scanning point cloud, on a basis of the second superposed image;

determine correspondence relationships between the first partial point cloud and the second partial point cloud; and determine correspondence relationships between the first laser scanning point cloud and the second laser scanning point cloud on a basis of the correspondence relationships between the first partial point cloud and the second partial point cloud.

\* \* \* \* \*